Figure 1:
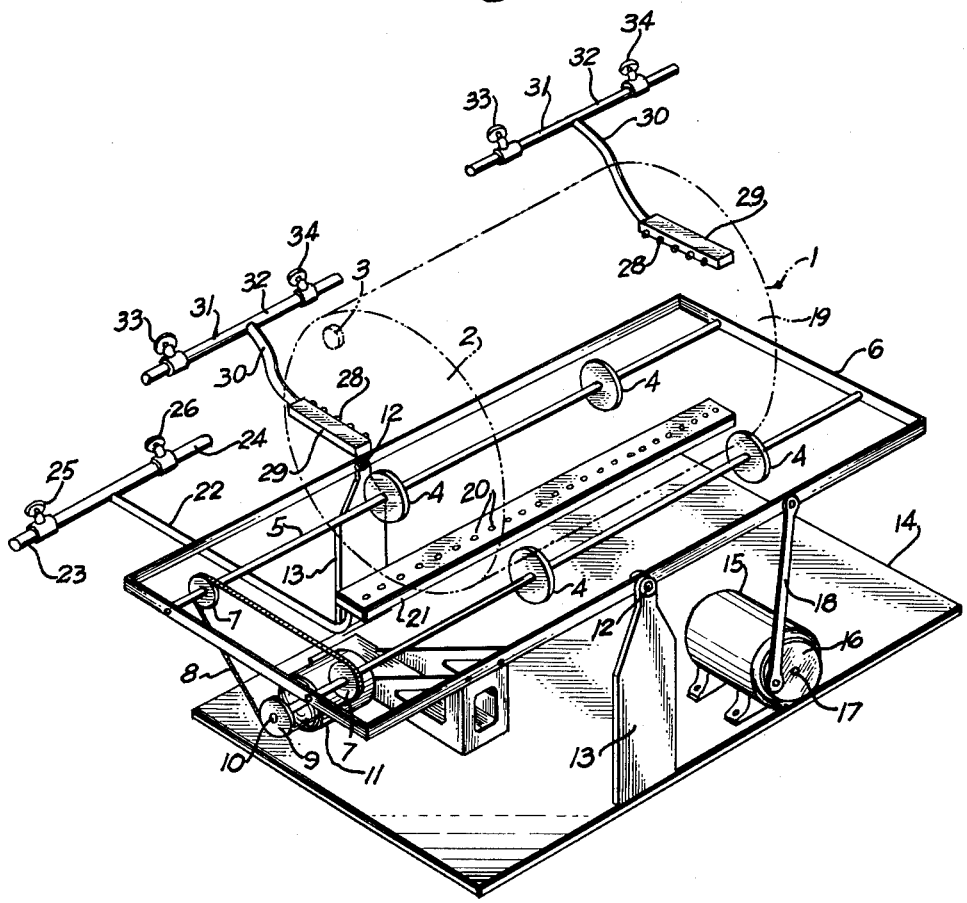

May 26, 1964    R. G. KNOWLES    3,134,140
APPARATUS FOR MOLDING HOLLOW ARTICLES
Filed June 7, 1961

INVENTOR
RICHARD GODFREY KNOWLES

BY Toulmin & Toulmin

ATTORNEYS

United States Patent Office

3,134,140
Patented May 26, 1964

3,134,140
APPARATUS FOR MOLDING HOLLOW ARTICLES
Richard Godfrey Knowles, Knightsbridge, London, England, assignor to Vasco Industries Corporation, New York, N.Y.
Filed June 7, 1961, Ser. No. 115,566
Claims priority, application Great Britain June 7, 1960
8 Claims. (Cl. 18—26)

The present invention relates to the manufacture of shaped, hollow articles from thermoplastic in powder or fine granular form and in particular, to containers such as drums, drum liners, bottles and the like, generally cylindrical articles.

Various methods have been proposed for the manufacture of hollow containers from thermoplastic in powdered form and although satisfactory articles may be manufactured by these methods there is, during the course of manufacture, a considerable wastage of powdered thermoplastic. In the known manufacturing methods, an excess of powdered thermoplastic is placed within a mold which is then heated to melt the thermoplastic powder in contact with the mold surface so that a fused layer or film of thermoplastic is formed. After a layer, constituting the wall of the article being molded, having the required thickness has been built up, the excess thermoplastic powder is removed from the mold. It is during this removal of excess powder that wastage generally occurs.

It is an object of the present invention to provide an improved apparatus for manufacturing shaped hollow articles from thermoplastic in powder or fine granular form.

Another object of the invention is to provide for the easy exchange of molds so that a continuous and rapid operation is ensured.

It is a further object of the present invention to provide for the molding of hollow articles of a wide variety of sizes, and especially relatively large articles of cylindrical or nearly cylindrical shape, by a single apparatus which will gravitationally support a mold of the required size and will rock and roll the mold so as to cause even distribution and the fusion into a coherent layer within the mold of the thermoplastic powder used for forming the molded article.

Other objects and advantages of the invention will be apparent from the following description in conjunction with the accompanying drawing.

FIG. 1 is a perspective view of an apparatus embodying this invention.

The present invention provides apparatus of a type especially suitable for manufacturing shaped, hollow articles from thermoplastic in powder or fine granular form, of a particle size of about 0.01 to about 0.5 mm., such thermoplastics being, for example polyolefine, polyamide, and preferably polyethylene. While the apparatus may be used for molding various flowable materials, it serves excellently for the molding of such thermoplastics in powdered form by a method which comprises heating a mold having an internal molding surface corresponding to the desired external shape of the article and simultaneously rolling the mold about one axis occurring at its own center while rocking said mold about an axis normal to said axis of rolling movement, whereby thermoplastic powder within the mold is spread substantially evenly over the molding surface and fused into a continuous layer or film, then cooling the mold to set the thermoplastic powder and removing the formed article from said mold.

Preferably a pre-determined quantity of thermoplastic powder sufficient only to form a continuous layer or film having the desired thickness, is placed within the mold. As the mold is rolled and rocks, thermoplastic powder is tumbled over the molding surface whereby said powder initially adheres to said surface, forming an encrustation of semi-fused thermoplastic powder. Continued heating causes the encrustation to fuse into a continuous layer or film.

According to the present invention, there is provided an apparatus especially useful for manufacturing shaped hollow articles from thermoplastic in powder or fine granular form, which comprises a stationary base, a generally horizontally extended frame mounted on the base, upwardly facing support means mounted on the frame for supporting rollably thereon, in gravitational and peripheral engagement with the support means, a rollable hollow mold having an internal molding surface conforming to the external shape of an article to be produced, the support means being movable continuously relative to the frame in peripheral engagement with the mold to roll the mold about an axis disposed at its own center above the support means, and means connected with the frame and operable simultaneously with the mold-rolling movement of the support means for rocking the frame and a rolling mold thereon about an axis crossing the axis of rolling movement, so as to spread a charge of the molding material within the mold and substantially evenly over said molding surface. Means are also provided for heating the exterior of the mold while it is being rolled and rocked to fuse the spread material within it into a continuous layer on the molding surface; and drive means are provided to effect the rolling movement of the mold by peripheral engagement therewith.

The drive means to roll the mold may be carried by the rockable frame and preferably comprises rollers which constitute the above mentioned support means, these rollers having upwardly facing peripheral portions defining a molding station to receive and to drive by peripheral engagement a mold or molds supported gravitationally upon them, and these rollers being driven by an electric motor mounted on the frame. The mold may be provided with two annular external drive surfaces lying in spaced planes normal to their central axes which form the axis of the rolling movement of the mold, said annular surfaces being engaged by drive rollers carried by shafts rotatably mounted in the frame and coupled to the drive means. If the external surface of the mold is cylindrical, the annular surfaces may be formed integral therewith and if said exterior surface is other than cylindrical the annular surfaces may be constituted by rings attached to the mold.

The means to rock the frame may comprise an electric motor mounted on the stationary base of the apparatus and coupled through an eccentric and a crank arm to the frame. Any suitable form of heating means may be employed, but it is convenient and time-saving to use flaming gas jets which play against the external surfaces of the mold.

An embodiment of the present invention is illustrated in the accompanying schematic drawing which shows a perspective view of a molding apparatus.

The apparatus illustrated in the accompanying drawing and described hereinafter is primarily intended for the manufacture of closed, cylindrical liners of polyethylene, which liners are intended for use in drums of fibrous material. It will be appreciated however, that the present invention is not limited to the manufacture of such liners and can be applied to the manufacture of other forms of hollow articles.

A hollow mold 1 has an internal, cylindrical molding surface corresponding to the desired external shape of the drum liner to be manufactured. An end face 2 of the mold is formed with a mold recess 3 having a shape corresponding to the desired shape of the pouring spout or outlet of the liner. The end face 2 may be detachably secured to the main body of the mold 1 to facilitate the placing of or a removal of the charge of thermoplastic powder in the mold or alternatively the other end face 19 of the mold may be detachable. The main body portion of the mold is constructed so that it may be split to facilitate the removal of a formed liner. The external surface of the mold 1 is cylindrical in form and said mold rests on rollers 4 mounted on two spaced shafts 5 rotatably mounted in a rocking frame 6. The shafts 5 carry chain sprockets 7 which are engaged by a driving chain 8, which is entrained around a driving sprocket 9 mounted on a drive shaft 10 of an electric motor 11 carried by the rocking frame 6. It will be appreciated that the drive of the electric motor 11 is imparted to the mold 1 by the peripheral engagement of annular portions of its external surface by upwardly facing peripheral portions of the rollers 4 so that said mold is rolled upon the rollers about its own longitudinal axis.

The rocking frame 6 is pivotally attached at 12 to two fulcrum members 13 upstanding from a base 14 of the apparatus. An electric motor 15 is mounted on the base 14 and has an eccentric 16 carried by a motor drive shaft 17. A crank arm 18 is pivotally attached at one end to the eccentric 16 and at its other end to the rocking frame 6.

The arrangement of the eccentric 16 and crank arm 18 is such that as the electric motor 15 operates, rotating the eccentric 16, a reciprocating motion is imparted to the crank arm 18 which causes the rocking frame 6 to rock back and forth with a "see-saw" action about its pivots 12. The axis of rocking movement defined by these pivots intersects the location of a mold supported on the rollers.

Gas jet ports 20 are formed in an elongated burner member 21 extending in an axial direction below the mold 1, and a mixture of gas and air is fed to the gas jets 20 through a pipe line 22 coupled to a gas pipe line 23 and an air pipe line 24. A regulator valve 25 controls the flow of gas through the pipe line 23 and a regulator valve 26 controls the flow of air through the pipe line 24. The flames formed by the gas jets at 20 serve to heat the cylindrical body of the mold 1 as it is rotated by the drive from the rollers 4.

The end faces 2 and 19 of the mold 1 are heated by flaming gas jets issuing from ports 28 formed in burner members 29, which are radially disposed with respect to the end faces 2 and 19 so that, as the mold rotates, heat is applied over the entire surfaces of said end faces. A mixture of gas and air is supplied to the gas jet ports 28 by pipe lines 30 coupled to gas pipe lines 31 and air pipe lines 32 through which gas and air flow under the control of regulator valves 33 and 34 respectively.

To use the apparatus hereinbefore described, a cold, empty mold is charged with a predetermined quantity of thermoplastic in powdered form and the charged mold is then placed on the rollers 4. With the gas jets at 20 and 28 burning, the electric motors 11 and 15 are switched on so that the mold is rotated or rolled about its own longitudinal axis and simultaneously is rocked back and forth with a "see-saw" action on the cross axis at the pivots 12. This combined rolling and rocking motion of the mold causes the thermoplastic powder within the mold to be tumbled over the entire molding surfaces thereof. As the interior molding surfaces of the mold reach a temperature corresponding to the melting point of the thermoplastic powder, said powder adheres to the molding surfaces to form an encrustation of semi-fused thermoplastic powder. As heating is continued, with the continued rotating and rocking motion of the mold, the encrustation of thermoplastic powder becomes fused into a continuous film or layer. It has been found, in practice, that the simultaneous rotating and rocking motion of the mold causes a continuous layer of thermoplastic to be formed over the entire molding surfaces of the mold, said layer having a substantially even thickness. When the continuous layer or film has been formed, the mold is removed and cooled to set the thermoplastic. After cooling, the mold is opened to allow the completed thermoplastic article, which in this case is a drum liner, to be removed. To facilitate this removal of the article from the mold the cylindrical mold body may be so constructed that it can be split in two.

To ensure that the end faces of the mold are evenly and properly coated with thermoplastic powder, the rocking frame 6 should be rocked back and forth to at least an angle of 45° with respect to the horizontal. To allow such rocking to take place the burner members 21 and 29 forming the gas jets at 20 and 28 may be attached to the rocking frame 6 to move therewith.

Since only the thermoplastic powder used in the article is used in the process there is no chance of wastage, spillage or foreign matter entering the thermoplastic during the molding cycle. By preweighing the thermoplastic powder an accurate control can be kept on the material used in the process and also on the thickness of the walls of the article. It will be appreciated that a cylindrical container closed at each end can be molded as a whole by the method and apparatus according to the present invention.

In practice, a plurality of molds would be used in conjunction with one apparatus so that as one mold is being charged with thermoplastic powder, a second mold is being heated and rocked and rolled in the apparatus and a third mold is being cooled and opened to release a molded article. The apparatus is thus in continuous operation to produce molded articles from thermoplastic powder in a simple and rapid manner.

To manufacture a drum liner having a length of 21 inches, a diameter 13⅞ inches and a wall thickness of 0.075 inch it has been found that 56 ounces of polythylene powder are required. An article of this size can be manufactured in 3½ minutes, the mold being rotated at 60 r.p.m. and rocked back and forth 10¾ times. These data indicate that the preferred ratio between rotations and rocking cycles is about 6 to 1, whereby the rotations are expressed in r.p.m. and a rocking cycle is one complete up and down movement. The mold, when placed in the apparatus is cold, that is to say at a temperature corresponding to the ambient temperature and, upon removal from the apparatus after the molding cycle, it is found that the mold is at a temperature of 190° C. To cool the mold it may be immersed in a water bath and then split open to release the molded thermoplastic drum liner.

If it is desired to mold an article which is not cylindrical in form the apparatus according to the present invention can still be used; for, although the external surface of the mold body may not be cylindrical in form, annular guide tracks constituted by rings attached to the external surface of the mold can be provided which rings are received by the rollers 4. Likewise the heating arrangement can be varied to suit particular requirements, for example, radiant heat may be applied to the exterior surface of the mold or induction heating of the mold itself may be employed.

It will be understood that this invention is susceptible to further modification and, accordingly, it is desired to comprehend such modifications within this invention as may fall within the scope of the appended claims.

What is claimed is:

1. An apparatus for producing shaped hollow articles from flowable molding material, comprising a stationary base, a generally horizontally extended frame mounted on said base, upwardly facing support means mounted on said frame for supporting rollably thereon in gravitational and peripheral engagement with said support means a substantially closed rollable hollow mold having longitudinal and end walls forming an internal molding surface conforming to the external shape of an article to be produced, said support means being movable continuously relative to said frame about generally horizontal axes therein and in continuing peripheral engagement with said mold whereby said mold placed and rolled upon said support means will move peripherally therewith but in rolling motion about a generally horizontally axis of its own disposed at its own center above said support means, and means connected with said frame and operable simultaneously with the movement of said support means about said axes thereof for continually rocking said frame and a mold rolling thereon about an axis transverse to said axes in see-sawing motion having an amplitude sufficient to spread a charge of said material within said mold substantially evenly over both the longitudinal and the end wall areas of said molding surface.

2. An apparatus according to claim 1, said base comprising upstanding members at opposite sides of said frame and means mounting the frame on said members for see-saw movement on an axis located substantially at the center of said frame and intersecting the location of a mold being rolled upon said support means.

3. An apparatus according to claim 1, said means for rocking said frame being operative to rock each end of the frame alternately downwardly and upwardly to an angle of at least 45° to the horizontal.

4. An apparatus according to claim 1, said support means comprising shafts spaced apart and rotatable in said frame and rollers fixed to said shafts to engage and support peripherally the under side of the mold; and drive means including a motor mounted on said frame and transmission means connecting said motor with at least one of said shafts for rotating said rollers and thus rolling the mold upon them while the mold is being rocked with said frame.

5. An apparatus according to claim 4, said drive means being operative to roll a mold upon said rollers through approximately six revolutions for every complete rocking cycle of said frame.

6. An apparatus for producing shaped hollow articles from thermoplastic material in finely divided solid form, comprising a stationary base, a generally horizontally extended frame mounted on said base, upwardly facing support means mounted on said frame for supporting rollably thereon in gravitational and peripheral engagement with said support means a substantially closed rollable hollow mold having longitudinal and end walls forming an internal molding surface conforming to the external shape of an article to be produced, said support means being movable continuously relative to said frame about generally horizontal axes therein and in continuing peripheral engagement with said mold whereby said mold placed and rolled upon said support means will move peripherally therewith but in rolling motion about a generally horizontal axis of its own disposed at its own center above said support means, means connected with said frame and operable simultaneously with the movement of said support means about said axes thereof for continually rocking said frame and a mold rolling thereon about an axis transverse to said axes in see-sawing motion having an amplitude sufficient to spread a charge of said material within said mold substantially evenly over both the longitudinal and the end wall areas of said molding surface, and means comprising gas burners having ports arranged to play flaming gas jets directly against the external longitudinal and end surfaces, respectively, of the rolling and rocking mold for heating said surfaces so as to fuse the spread material within the mold into a continuous layer on said molding surface.

7. An apparatus for producing shaped hollow articles from thermoplastic material in finely divided solid form, comprising a stationary base, a generally horizontally extended frame mounted on said base, a plurality of parallel generally horizontal shafts spaced apart and rotatable in said frame and each having rollers fixed thereto at locations spaced apart therealong, upwardly facing peripheral portions of said rollers defining a molding station to receive, and to roll in peripheral engagement with said roller portions, a substantially closed rollable hollow mold supported gravitationally thereupon, said mold having annular external surfaces adapted to engage said rollers and having longitudinal and end walls forming an internal molding surface conforming to the external shape of an article to be produced, drive means mounted on said frame for rotating said shafts and thus rolling said mold about a generally horizontal axis of its own disposed at its own center above said rollers, means mounted on said base and connected with said frame for continually rocking said frame and a mold rolling thereon about an axis transverse to the axes of said shafts in see-sawing motion having an amplitude sufficient to spread a charge of said material within said mold substantially evenly over both the longitudinal and the end wall areas of said molding surface, and means for heating the exterior of said mold while the mold is being rolled and rocked to fuse the spread material into a continuous layer on said molding surface.

8. An apparatus according to claim 7, said frame being mounted for see-sawing movement on an axis located substantially at the center of the frame and intersecting the location of a mold supported upon said rollers; said means for rocking said frame being operative to rock each end of the frame alternately downwardly and upwardly to an angle of at least 45° to the horizontal; said heating means comprising gas burners having ports arranged to play flaming gas jets directly against the external longitudinal and end surfaces, respectively, of the rocking and rolling mold.

References Cited in the file of this patent

UNITED STATES PATENTS

| Number | Name | Date |
| --- | --- | --- |
| 1,181,452 | Hume | May 2, 1916 |
| 1,992,739 | Carrington | Feb. 26, 1935 |
| 2,252,219 | Trotzke | Aug. 12, 1941 |
| 2,659,107 | De Bell | Nov. 17, 1953 |
| 2,736,925 | Heisler et al. | Mar. 6, 1956 |
| 2,859,151 | Usab et al. | Nov. 4, 1958 |
| 2,881,476 | Page | Apr. 14, 1959 |
| 2,904,836 | Jefferson et al. | Sept. 22, 1959 |

FOREIGN PATENTS

| Number | Country | Date |
| --- | --- | --- |
| 842,347 | Great Britain | July 27, 1960 |